C. FREDRICKSON.
FRUIT GRADING MACHINE.
APPLICATION FILED MAY 8, 1919.

1,322,420.

Patented Nov. 18, 1919.
3 SHEETS—SHEET 1.

WITNESSES

INVENTOR
C. FREDRICKSON
BY
ATTORNEYS

C. FREDRICKSON.
FRUIT GRADING MACHINE.
APPLICATION FILED MAY 8, 1919.
1,322,420.
Patented Nov. 18, 1919.
3 SHEETS—SHEET 2.
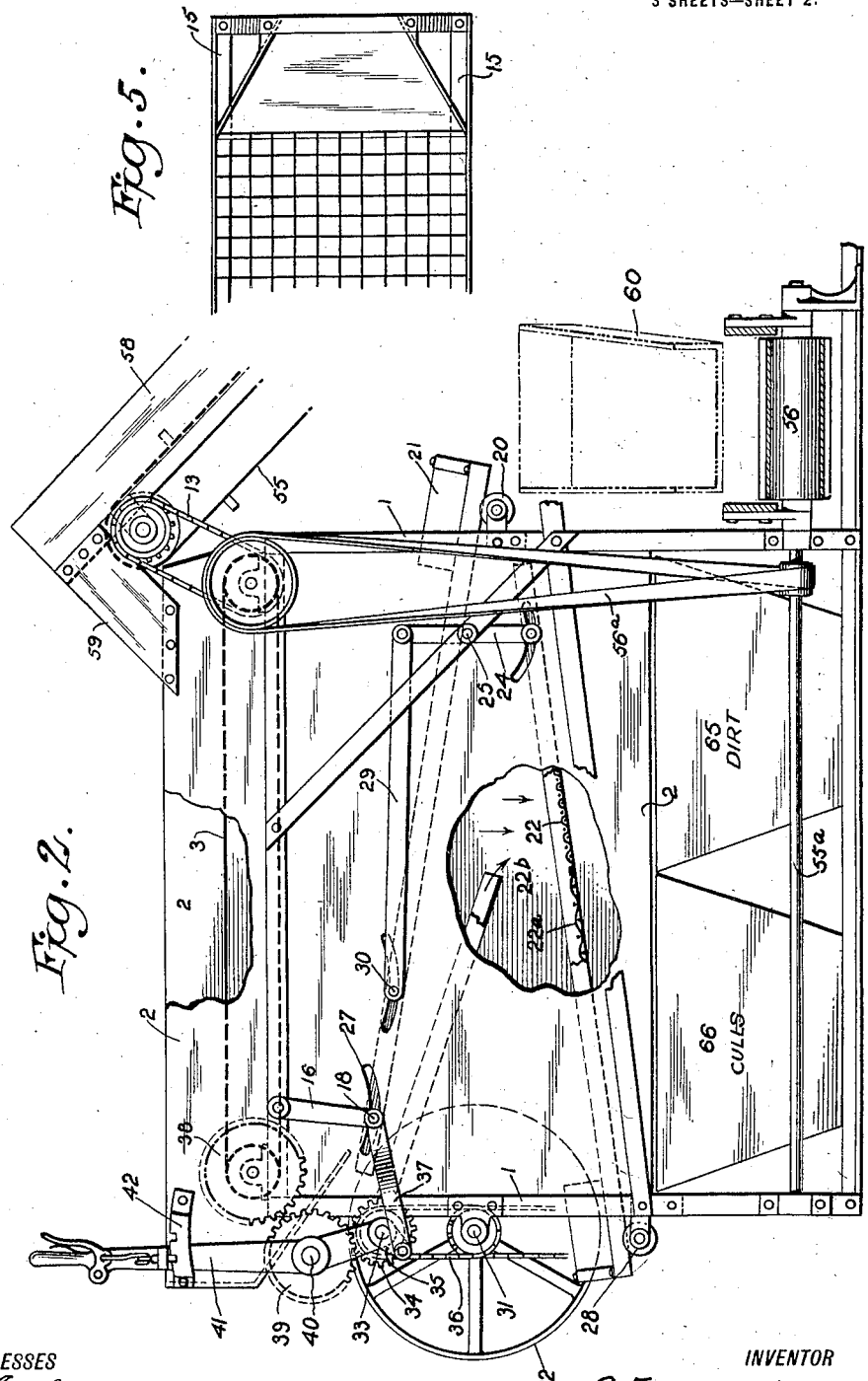
WITNESSES
INVENTOR
C. FREDRICKSON
BY
ATTORNEYS

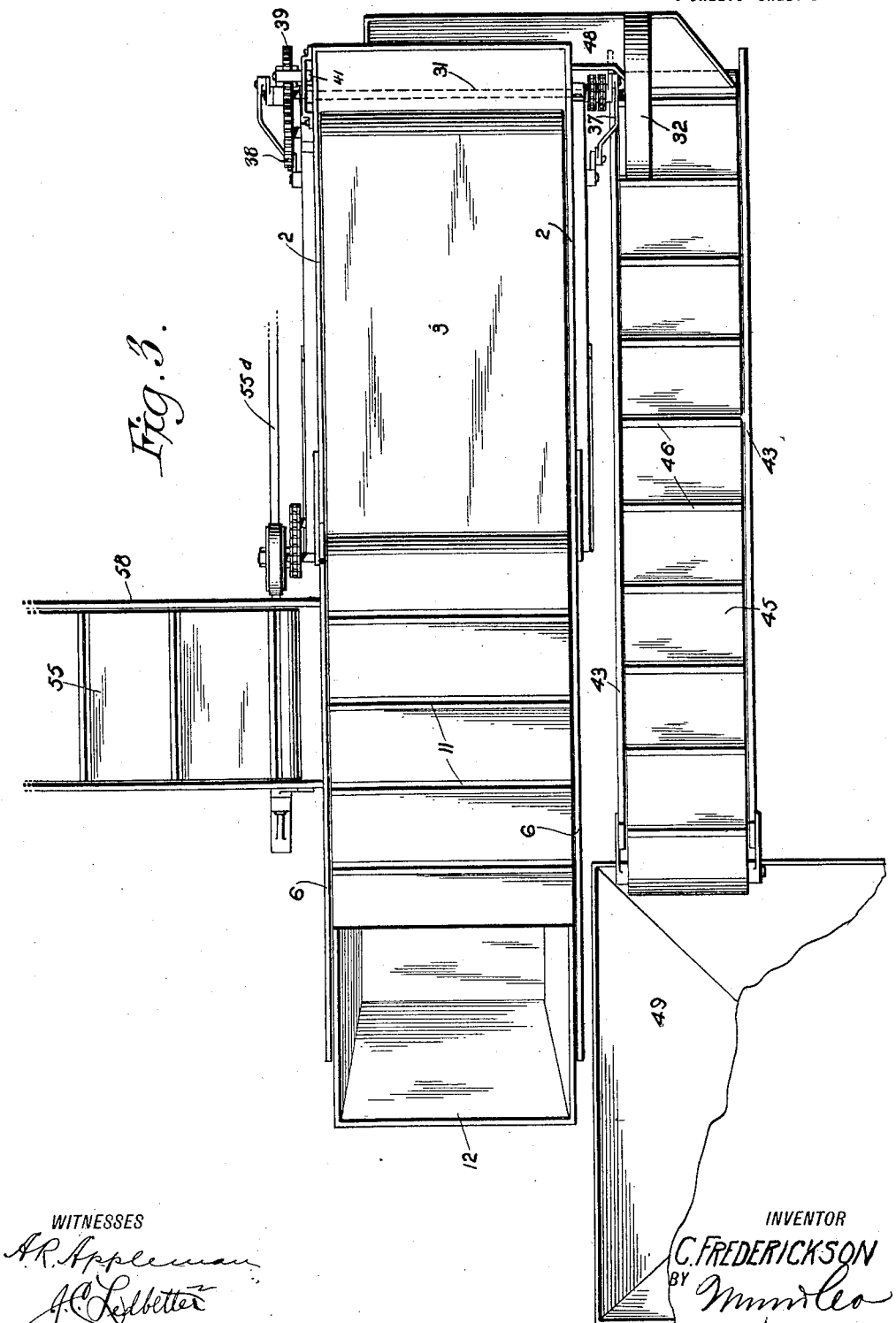

UNITED STATES PATENT OFFICE.

CHRISTIAN FREDRICKSON, OF RICE LAKE, WISCONSIN.

FRUIT-GRADING MACHINE.

1,322,420.  Specification of Letters Patent.  Patented Nov. 18, 1919.

Application filed May 8, 1919. Serial No. 295,574.

*To all whom it may concern:*

Be it known that I, CHRISTIAN FREDRICKSON, a citizen of the United States, and a resident of Rice Lake, county of Barron, and State of Wisconsin, have invented a new and Improved Fruit-Grading Machine, of which the following is a full, clear, and exact description.

This invention relates to fruit grading machines. More particularly it relates to machines for grading potatoes and other vegetable tubers which may be desirable to separate into different grades according to size of fruit.

An object of the invention is to produce the design of a fruit grading machine which may be used on the farm or plantation for grading potatoes, and for separating the potatoes or similar fruit into grades of various sizes. A feature of the invention resides in means adapted to spread the fruit out and pass same before operators who will pick out the undesirable fruit before it passes into the grader. Another feature of the invention resides in means for shaking and separating the soil from the fruit as said fruit passes through the grading process.

A provision is made within the machine for elevating each grade of fruit, after it has been separated from other grades, up to a convenient height so that the fruit may be loaded into sacks or other containers brought up to the machine. It is also a purpose of this machine to separate the dirt, culls, peels and other undesirable substances from all classes and grades of fruit handled by this machine.

With the above objects in view, it is also a purpose to produce a machine of such utility characteristics as to find a wide range of uses both on the farm and in produce houses, and which machine will be comparatively simple in construction and operation and unlikely to get out of working order.

With the above and other objects in view the invention has relation to certain combination and arrangement of parts, an example of which is described in the following specification, pointed out in the appended claims and illustrated in the accompanying drawings, wherein:

Figure 1 discloses my fruit grading machine in side elevation, with portions thereof broken away.

Fig. 2 shows a side elevation of the machine opposite to that of Fig. 1.

Fig. 3 illustrates a plan view of the fruit grader.

Fig. 5 shows a plan view of one end of a certain shaker grate used in grading the fruit.

Figures 1, 4:
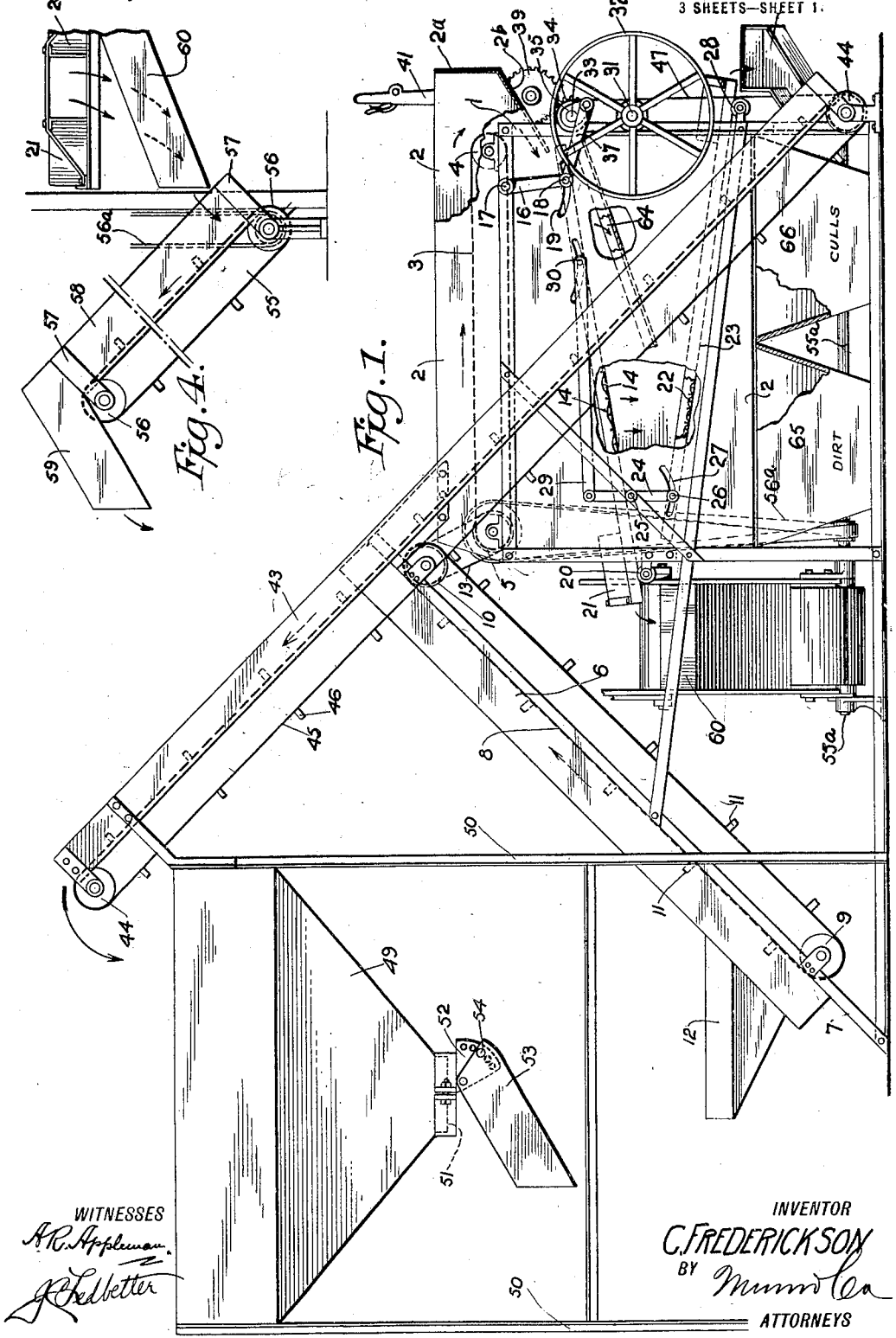
Fig. 4 shows a detail view of a certain elevator employed in the invention.

Referring now more in particular to the drawings, wherein the same parts throughout are designated by like reference characters, the numeral 1 points out frame posts which support the frame work of the machine. Sheet metal sides 2, or closure walls are secured on the main frame of the machine and substantially incloses each side of the machine as shown in Figs. 1 and 2. The rear end of the machine is preferably left open while the front end is closed by the wall 2$^a$. This wall is turned back at an angle as indicated at 2$^b$ thus forming a delivery plate, the purpose of which will be later disclosed. The top of said casing will be formed open to permit the operator to inspect and pick out undesirable fruit.

What I prefer to call a picking table is provided in the upper portion of the casing of this machine. This comprises an endless belt 3 which is confined in a traveling relation upon pulleys 4 and 5 journaled in the side walls of the machine. A fruit elevator comprising side walls 6 secured to beams 7, is supported at the lower end on the ground floor while the upper portion of the elevator is so positioned as to be slightly above and extended over one end of the picking table. An endless moving belt 8 is confined in a rolling relation upon rollers 9 and 10 supported and journaled in brackets fixed to the frame of the elevator. Elevator bars 11 are secured to the endless belt 8 and are provided to elevate the fruit from the lower end of the elevator up to the picking table. A fruit receiving hopper 12 is mounted on the lower portion of the elevator and is provided there for the purpose of receiving fruit to be passed through the grader. A chain 13 is adapted to transmit power from the picking table to the elevator. To this end a sprocket wheel is carried upon a roller shaft of the picking table and the elevator, which sprockets receive the chain 13. The direction of travel of the picking table and the elevator is indicated by the arrows in Fig. 1 and is such that the fruit will be elevated from the receiving hopper 12 and deposited upon the belt 3.

A fruit receiving grate 14 substantially the length of the casing is arranged beneath the picking table. This grate comprises a wire gauze 14 tightly stretched between the frame or angle members 15. This grate is arranged in the machine with one end higher than the other which causes the delivery end of the grate to extend downwardly through the machine and thus facilitate passage of fruit over the grate gauze. The upper end of this grate is suspended upon vibrator arms 16 which are pivotally mounted upon pins 17 fixed in the frame of the machine. Pins 18 are permanently secured to the angle members 15 of the grate. These pins project through slots 19 formed in side walls of the machine. The lower end of the grate is freely mounted upon a roller 20, which is journaled in brackets secured to the frame. The lower end of the grate is provided with side plates 21 which extend somewhat above the frame angles 15, and also extend back into the casing. These side plates 21 will confine the fruit in straight line delivery from the machine thus preventing said fruit from spilling over the sides of the grate. It is seen how the grate is suspended upon the vibrating arms and free to move back and forth upon the roller 20, and means are provided for subjecting the grate to a continuous longitudinal movement of short amplitude for the purpose of vigorously shaking up the fruit which is on the grate.

Another fruit receiving grate table comprising gauze 22 secured to frame members 23 is arranged beneath the aforesaid grate and adapted to receive fruit which drops through the mesh of the upper grate down on to the grate now described. The mesh or gauze 22 of this latter described grate is fitted with a finer mesh than the upper grate. The gauze 22 is a finer meshed material than the gauze of the grate bar above. This gauze 22 extends from the upper end of the grate 23 to the middle portion thereof, where a gauze 22$^a$ of slightly larger mesh than 22 is employed and extends the remaining length of the grate 23. I, therefore, have a lower grate composed of two grades of mesh, the smaller mesh being employed on the upper portion of the grate and the larger mesh being used on the lower portion of the grate. The two gauze materials join each other in the center of the grate as pointed out at 22$^b$. The purpose of this form of construction will hereinafter be disclosed. The vibrator arms 24 are pivoted upon the frame at 25 and connect with pins 26 which project through slots 27 formed in the side walls. This adapts the grate 23 to be supported at its rear end by the vibrator arms 24. The forward end of this grate is supported upon a roller 28 in a manner similar to the grate hereinbefore described. A connecting link 29 is pivotally attached to the upper end of the vibrator arm 24 and is pivotally joined to a pin 30, which is secured to the frame plates 15 of the upper grate. This pin 30 is passed through a slot cut in the casing.

A main drive shaft 31 is journaled in the frame of the machine preferably at the front end thereof, and a main drive pulley 32 is fixed upon the shaft. A shaft 33 upon which is mounted a gear 34 is journaled in a bearing fixed to the frame above the main drive shaft. A crank arm 35 is fixed to the shaft 33. A chain 36 is carried upon sprockets which are fixed to the shafts 31 and 33. This chain transmits power from the shaft 31 to 33. A vibrating link 37 is pivotally confined upon the crank arm and connects with the pin 18 fixed in the frame 15 of the upper fruit receiving and shaker grate. Power is, therefore, transmitted from the main drive pulley through the parts mentioned into the upper shaker grate which subjects said grate to a vibrating motion back and forth over the roller. The vibratory motion of this upper grate is in turn transmitted to the lower grader grate through the connecting link 29. A gear 38 is fixed upon the shaft of the roller or pulley 4. An intermediate gear 39 is journaled upon a stud 40. This bearing 40 is fixed to a lever 41, this lever being mounted upon the shaft 33. The upper end of the lever is movably confined within a notched bracket 42 adapted to hold the lever in any set position through the ratchet and pawl means, as illustrated. The intermediate gear 39 is mounted in a meshed relation with gear 34, but is shown disengaged from the gear 38. The lever 41 may be moved rearwardly until the gear 39 meshes with the gear 38, thus driving the picking table and the elevator 8 from the main power shaft.

A conveyer elevator comprising frame pieces 43 supporting rollers 44 at the upper and lower ends thereof, is placed in a position adjacent the side of the machine. The elevator is furnished with an endless conveyer belt 45 which has parallel elevator bars or slats 46 attached thereto. A sprocket is fitted to the shaft which carries the lower roller 44 and a chain 47 is employed to transmit power from a sprocket fixed to the shaft 33 to the roller 44. This elevator is, therefore, in continuous operation through the power received from the main power shaft 31. A spout 48 is arranged underneath the delivery end of the grate 23, and adapted to pass the fruit from the grate 23 into the lower end of this elevator last described.

A receiving hopper 49 supported upon a frame 50 is placed under the upper delivery end of the elevator 45 and adapted to receive the fruit from the elevator. This receiving hopper is furnished with an open delivery orifice 51. A bracket 52 is secured to the hopper and pivotally retains a delivery chute 53. This chute is pivoted upon the bracket and fitted with a ratchet pin 54 adapted to engage holes formed in the bracket. By removing the ratchet pin 54 the chute can be adjusted to any angle desired and retained in said position by inserting the pin in any selected hole.

Another elevating conveyer apparatus similar to the conveyers hereinbefore described, is placed at the rear of the grading machine and underneath the delivery end 21 of the shaker grate 14. This conveyer embodies a moving belt 55 mounted on rollers 56 carried in bearing brackets 57 secured to side plates 58. The upper portion of this conveyer may be provided with a delivery chute 59 for depositing the potatoes or fruit from the conveyer into a sack suspended upon the chute 59, or into any form of container. A detail of this last described elevator is shown in Fig. 4. The fruit passes from the delivery end 21 of the grate 14 and gravitates into a chute 60 which guides the fruit down onto the conveyer belt 55. This conveyer extends upwardly from the ground or floor upon which the grader is mounted and out from underneath the elevator 8 such that all the upper delivery ends of the elevators are distant from each other and, therefore, accessible for use in such a manner as to prevent the operators of this machine from getting in each other's way. A drive shaft is journaled on the frame of the machine and carries fixed thereto the lower roller 56. The conveyer belt 55 is driven by a belt or chain 56ª.

A dirt shield 64 comprising a receiving plate substantially the same width as the casing of the machine, is fixed within said casing in an angular relation as illustrated in the drawings. This shield terminates above the designated point 22ᵇ just where the fine and coarse mesh join, and the angle of this shield or plate member is sufficient to impart a considerable moving velocity to any substance which may be received thereon.

A dirt receiving box 65 and a cull container 66 is placed beneath the grading machine just under the shaker grate 23. The box 65 is adapted to receive dirt and for this purpose is placed under the finer mesh 22, while the box 66 is adapted to receive culls and for this purpose is placed underneath the mesh 22ª. The box may be conveniently removed from underneath the machine and the contents thereof emptied from time to time during the operation of the machine.

A description has been given of the construction of my grader, and I will now describe its operation.

In the operation of this potato or fruit grading machine the products to be graded will be brought from the field and deposited into the receiving hopper 12. It will be understood that soil and dirt adhere to potatoes brought from the field. Culls, peelings, and other by-products of different varieties of fruit may be included in the mass of material deposited in the receiving hopper 12. The machine will be set in operation and fruit carried up the elevator 8 and deposited upon the picking table 3. At this point attendants will carefully watch the fruit products as they move along the table and pick or throw out any undesirable fruit observed. The fruit will be gravitated upon the plate 2ᵇ and dropped upon the grate 14. This grate is under continuous vibration which causes the fruit to move along the mesh toward the delivery end 21. The larger fruit will be deposited into the chute 60 and elevator 55, thence up the elevator 55 and into the delivery spout 59 where the potatoes are stacked or received in other containers provided for that purpose. This disposition of the materials into the elevator 55 takes care of all the number one fruit. I name this first grade or number one fruit because it is of larger size than the grades hereinafter described. I secure the number one grade by virtue of its inability to pass through the substantially large mesh 14 of the first shaker grate.

All the other fruit, culls, dirt and materials which did not come out of the machine as number one grade will gravitate through the grate 14 upon the lower grate 23. A considerable portion of material, and especially dirt and soil broken off of the potatoes due to the vibration of the shaker grate, will trickle downwardly upon the dirt shield 64. This shield 64 will deposit the dirt and waste materials upon the grate 23, but will deposit said materials beyond the cull box 66. This shield 64 will, therefore, prevent dirt being deposited into the cull box 66 by diverting it upon the mesh 22 directly above the dirt box 65. The mesh 22 permits the dirt and finer trash to drop into the box 65 and thus entirely separate it from my other grades of fruit secured at the various delivery ends of this grader. The mesh 22ª is of appropriate size to prevent the remaining fruit from dropping into the cull box but is of sufficient size to permit the peelings, culls and other by-products to be deposited into this box. The remaining fruit will gravitate along the grate and be deposited into the chute 48 which in turn delivers the produce to the elevator 45, thence into the receiving hopper 49 where a large quantity of the materials may accumulate and be drawn off at intervals through the spout 53, as number two grade.

I have now described how number one material, or first grade material or fruit is drawn from the machine and finally disposed therefrom through the delivery spout 59. I have also described how I draw off the grade number two or second class fruit or material, through the spout 53. Grade three or third class fruit or material, is drawn from the machine into the box 66 and classed as culls, or by-products. And finally the dirt broken and shaken from the fruit during the grading process is deposited in the box 65. Thus I have separated the potatoes or other fruits of the field into three distinct classes or grades. The third class material or culls can be used as stock food and sold for that purpose, and since the dirt is thoroughly removed from the culls by employing the dirt shield 64, the buyer of the culls will obtain a better class of material than heretofore sold.

The lever and gear disengaging means comprising the gear 39, bearing 40 and shifting lever 41, is specially provided and designed for convenience in use by any attendant standing adjacent the machine and picking fruit from the moving table 3. Should the attendants be unable to select and pick out the fruit as fast as it moves by them the gear 39 will be disengaged which will give the attendants ample time for their work, and then the movement of the table will be resumed by engaging this intermediate gear 39. My fruit grading machine removes all culls from number two grade. By thus removing culls and peelings from number two grade I improve the quality and value of this lower grade produce.

Having thus described my invention, what I claim as new, and desire to secure by Letters Patent is:

1. In a fruit grading machine of the character described, the combination with a suitably inclosed frame, a moving picker table, a vibrating grader grate receiver placed beneath the picking table, another vibrating grader grate receiver placed beneath the first mentioned grate, an elevating conveyer arranged to receive the fruit from the first named grate, an elevating conveyer arranged to receive fruit from the second named grate, a cull and peel receiving hopper, a dirt receiving hopper, a dirt shield employed between the two aforesaid grates for the purpose of diverting dirt deposits from the cull hopper into the first receiving hopper, power operating means to drive the machine as described, and power disengaging apparatus employed for the purpose of stopping for any required length of time the picking table.

2. In a fruit grading machine of the character described comprising in combination, a frame, casing walls applied to the frame substantially inclosing the side walls of the machine, one end of the casing left open and the upper portion of the other end of the machine partially closed by a wall, a delivery plate formed attached to the wall and turned inwardly at an angle from said wall, a picker table arranged in the upper portion of said casing and adapted to deposit fruit upon the delivery plate, a vibrating grader grate receiver positioned beneath the picking table and adapted to receive fruit from the delivery plate, a dirt shield placed beneath the grate and arranged at an angle in relation with said grate, another vibrating grader grate receiver placed beneath the first named plate, and adapted to receive fruit from the first named grate and dirt from the dirt shield, a fine mesh gauze material carried by the last mentioned grate, and a coarse mesh gauze material carried by the last mentioned plate, a cull receiving hopper placed beneath the coarse mesh material of the last mentioned grate and a dirt receiving hopper placed beneath the fine mesh gauze of the grate, an elevating delivery apparatus adapted to receive the fruit coming from each grate, and power means provided to operate the machine.

3. In a fruit grading machine of the character described comprising in combination, a frame, casing walls applied to the frame substantially inclosing the side walls of the machine, one end of the casing left open and the upper portion of the other end of the machine partially closed by a wall, a delivery plate formed attached to the wall and turned inwardly at an angle from said wall, a picker table arranged in the upper portion of said casing and adapted to deposit fruit upon the delivery plate, a vibrating grader grate receiver positioned beneath the picking table and adapted to receive fruit from the delivery plate, a dirt shield placed beneath the grate and arranged at an angle in relation with said grate, another vibrating grader grate receiver placed beneath the first named plate and adapted to receive fruit from the first named grate and dirt from the dirt shield, a fine mesh gauze material carried by the last mentioned grate, and a coarse mesh gauze material carried by the last mentioned plate, a cull receiving hopper placed beneath the coarse mesh material of the last mentioned grate and a dirt receiving hopper placed beneath the fine mesh gauze of the grate, an elevating delivery apparatus adapted to receive the fruit coming from each grate, and power means provided to operate the machine, and a power disengaging element provided to disconnect the picking belt from the power means.

4. In a fruit grading machine of the character described, comprising in combination; a frame, a plurality of vibrating fruit grader grates carried in the frame, an elevator associated with each grader grate for conveying the graded fruit from the machine, a moving picker table adapted to convey fruit in view of operators who manually pick out and discard imperfect fruit, power means for operating the machine, and a power disengaging means for stopping and starting the moving picker table in case the operators cannot keep up with the selection of fruit.

CHRISTIAN FREDRICKSON.